US008676822B2

(12) United States Patent
Davis (10) Patent No.: US 8,676,822 B2
(45) Date of Patent: Mar. 18, 2014

(54) SYSTEM AND METHOD FOR QUALITY ASSURED MEDIA FILE STORAGE (75) Inventor: Steve Davis, Van Nuys, CA (US)

(73) Assignee: Disney Enterprises, Inc., Burbank, CA (US)

(*) Notice: Subject to any disclaimer, the term of this patent is extended or adjusted under 35 U.S.C. 154(b) by 1384 days.

(21) Appl. No.: 12/322,788

(22) Filed: Feb. 6, 2009

(65) Prior Publication Data
US 2010/0205162 A1 Aug. 12, 2010

(51) Int. Cl.
G06F 17/30 (2006.01)
G06F 21/00 (2013.01)

(52) U.S. Cl.
USPC .................. 707/758; 705/52; 705/75

(58) Field of Classification Search
USPC .......................... 235/458; 707/758
See application file for complete search history.

(56) References Cited

U.S. PATENT DOCUMENTS

| 6,757,648 | B2 | 6/2004 | Chen et al. | |
|---|---|---|---|---|
| 7,110,605 | B2 | 9/2006 | Marcellin | |
| 7,315,976 | B2 | 1/2008 | Holt | |
| 7,475,246 | B1 * | 1/2009 | Moskowitz et al. | 713/169 |
| 7,530,102 | B2 * | 5/2009 | Moskowitz | 726/13 |
| 7,532,725 | B2 * | 5/2009 | Moskowitz et al. | 380/252 |
| 7,568,100 | B1 * | 7/2009 | Moskowitz et al. | 713/176 |
| 7,647,502 | B2 * | 1/2010 | Moskowitz | 713/176 |
| 7,647,503 | B2 * | 1/2010 | Moskowitz | 713/176 |
| 7,664,263 | B2 * | 2/2010 | Moskowitz | 380/205 |
| 7,743,001 | B1 * | 6/2010 | Vermeulen et al. | 705/400 |
| 7,761,712 | B2 * | 7/2010 | Moskowitz et al. | 713/176 |
| 7,779,261 | B2 * | 8/2010 | Moskowitz et al. | 713/176 |
| 2002/0178410 | A1 * | 11/2002 | Haitsma et al. | 714/709 |
| 2005/0163223 | A1 | 7/2005 | Klamer | |
| 2006/0003295 | A1 * | 1/2006 | Hersch et al. | 434/110 |
| 2006/0005031 | A1 | 1/2006 | Apostolopoulos | |
| 2006/0006236 | A1 * | 1/2006 | Von Fellenberg et al. | 235/458 |
| 2006/0265427 | A1 | 11/2006 | Cohen | |
| 2007/0002946 | A1 | 1/2007 | Bouton | |
| 2007/0094583 | A1 | 4/2007 | Randall | |
| 2007/0133673 | A1 | 6/2007 | Imaizumi | |
| 2007/0242826 | A1 | 10/2007 | Rassool | |

(Continued)

FOREIGN PATENT DOCUMENTS

WO WO2005006677 1/2005
WO WO2005011279 2/2005

OTHER PUBLICATIONS

Lei, Zhijun, *Media Transcoding for Pervasive Computing*, ACM (2000).

Primary Examiner — Evens J Augustin
(74) Attorney, Agent, or Firm — Farjami & Farjami LLP (57) ABSTRACT There is provided a system and method for quality assured media file storage. There is provided a method for use by a processor to verify quality of a new media file by transcoding a master media file into a first media file, determining a quality of the first media file, applying a first quality assurance scheme to the first media file for an assured quality, calculating a first hash value using a hash function for the first media file, storing the first hash value in a memory, transcoding the master media file into a new media file, calculating a test hash value using the hash function for the new media file, and searching the memory for the test hash value to decide whether the new media file has the assured quality, without having to apply the first quality assurance scheme again to the new media file.

13 Claims, 4 Drawing Sheets

(56) References Cited

U.S. PATENT DOCUMENTS

| | | |
|---|---|---|
| 2008/0005802 A1 | 1/2008 | Fierstein |
| 2008/0037573 A1 | 2/2008 | Cohen |
| 2008/0243753 A1* | 10/2008 | Gormish et al. .................. 707/1 |
| 2008/0256315 A1* | 10/2008 | Awai ............................ 711/162 |
| 2009/0089427 A1* | 4/2009 | Moskowitz et al. .......... 709/225 |
| 2009/0177721 A1* | 7/2009 | Mimatsu ....................... 707/205 |
| 2009/0190754 A1* | 7/2009 | Moskowitz et al. ............ 380/44 |
| 2009/0210711 A1* | 8/2009 | Moskowitz .................. 713/171 |
| 2009/0220074 A1* | 9/2009 | Moskowitz et al. ............ 380/42 |
| 2010/0002904 A1* | 1/2010 | Moskowitz et al. .......... 382/100 |
| 2010/0005308 A1* | 1/2010 | Moskowitz .................... 713/176 |
| 2010/0064140 A1* | 3/2010 | Moskowitz .................... 713/176 |
| 2010/0077219 A1* | 3/2010 | Moskowitz .................... 713/176 |
| 2010/0077220 A1* | 3/2010 | Moskowitz .................... 713/176 |
| 2010/0098251 A1* | 4/2010 | Moskowitz .................... 380/255 |
| 2010/0106736 A1* | 4/2010 | Moskowitz et al. .......... 707/758 |
| 2010/0110514 A1* | 5/2010 | Houha et al. ...................... 359/2 |
| 2010/0153734 A1* | 6/2010 | Moskowitz et al. .......... 713/179 |
| 2010/0182570 A1* | 7/2010 | Matsumoto et al. .......... 351/224 |
| 2010/0202607 A1* | 8/2010 | Moskowitz et al. ............ 380/28 |
| 2010/0220861 A1* | 9/2010 | Moskowitz .................... 380/255 |

* cited by examiner

SYSTEM AND METHOD FOR QUALITY ASSURED MEDIA FILE STORAGE

BACKGROUND OF THE INVENTION

1. Field of the Invention

The present invention relates generally to data storage. More particularly, the present invention relates to media file storage.

2. Background Art

Consumers enjoy the freedom of playing their favorite media files on a wide variety of devices obtained from many different distribution channels. Media distribution services may allow consumers to download or stream media content from mobile phones, portable media players, videogame consoles, personal computers, set top boxes, and a myriad of other devices. Physical media remains prevalent as well, having certain advantages over digital distribution. Instant playback availability, high quality encoding, simplicity of use, and pride of ownership still provide compelling reasons for consumers to continue collecting physical media of their favorite programming.

However, all these varied platforms and devices may offer different display resolutions, compression codecs, bandwidth limitations, and other factors that need to be taken into account. Thus, content producers must typically produce specialized versions of an originally encoded master file, sometimes referred to as a mezzanine file, to create media files suitable for particular distribution channels, such as download services or physical media. The originally encoded master file might comprise uncompressed video data in RGB, RGBA, YUY2, YV12, or other color-spaces. The uncompressed video data might be further compressed with a lossless codec such as Huffyuv. Alternatively, by suffering minor quality degradation for substantial storage savings, a lossy but very high bitrate production codec such as MPEG 50i can be used instead. The video data could be contained in a number of different media container formats with embedded audio, such as AVI (Audio Video Interleave), MP4 (MPEG-4 Part 14), or MKV (Matroska). Once the originally encoded master file is suitably prepared, the specialized versions are produced by transcoding or decoding/re-encoding the master file to conform to the particular requirements of the specific distribution channel, such as maximum video and audio bit-rates or specific video resolutions.

Once these specialized or transcoded versions are generated, they generally require quality assurance checking to ensure that the final result is acceptable to human perception. In other words, assurance that the video and audio quality is satisfactory given the parameters of the distribution channel, free of glaring compression artifacts or other anomalies that may cause consumer dissatisfaction. Generally, this quality assurance testing is a manual process consuming valuable resources that might be otherwise put to more productive uses.

As a result, it might be helpful to store reference copies of transcoded videos already known to be quality assured to avoid duplicative quality assurance testing. However, this approach tends to consume large amounts of storage space, particularly when numerous distribution channels must be catered to. Although storage technologies continue to advance in capacity, they have generally not improved proportionally to swift advances in processing power. Moreover, highly reliable archival storage remains a difficult goal to achieve in a cost effective manner using present technology. Thus, it may be desirable to favor using computational resources rather than storage resources to minimize operating costs.

Accordingly, there is a need to overcome the drawbacks and deficiencies in the art by providing a way to ensure quality assured media file storage for transcoded media files without requiring a large storage footprint.

SUMMARY OF THE INVENTION

There are provided systems and methods for quality assured media file storage, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present application is directed to a system and method for quality assured media file storage. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
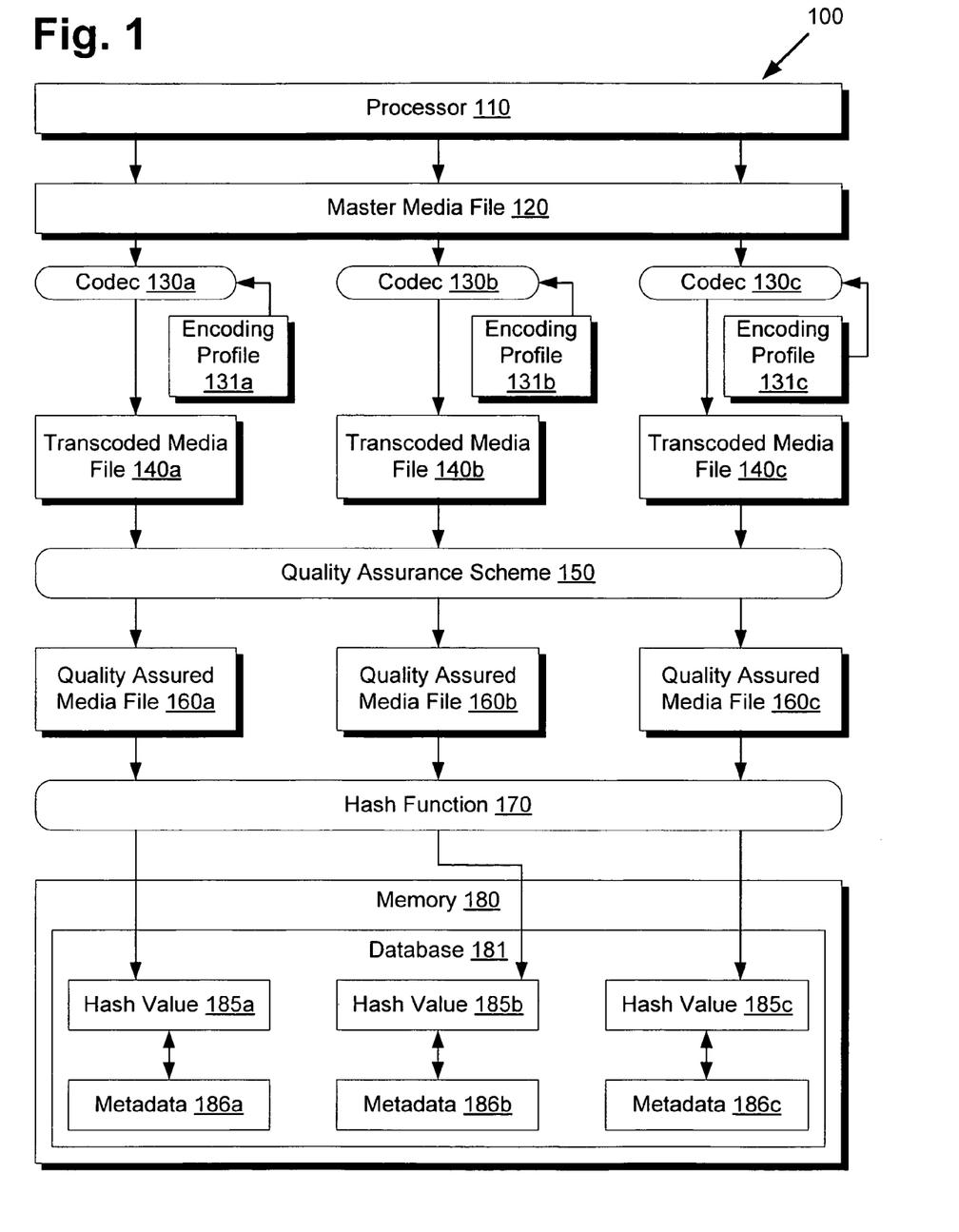
FIG. 1 presents a block diagram of a system generating hash values for quality assured media file storage, according to one embodiment of the present invention.

FIG. 1 presents a block diagram of a system generating hash values for quality assured media file storage, according to one embodiment of the present invention. Environment 100 includes processor 110, master media file 120, codecs 130a to 130c, encoding profiles 131a to 131c, transcoded media files 140a to 140c, quality assurance scheme 150, quality assured media files 160a to 160c, hash function 170, and memory 180. Memory 180 includes database 181, which includes hash values 185a to 185c.

Master media file 120 might comprise the high quality, high resolution, uncompressed or very high bit-rate original source material, such as a film, television drama, broadcast segment, animation, or any other program material. Environment 100 might then represent a configuration where master media file 120 is intended for three different distribution channels, each with different video and audio encoding requirements. Although environment 100 accommodates only three different distribution channels for simplicity, alternative embodiments may support several distribution channels to provide content for numerous platforms and devices. Furthermore, content production studios may have multiple master media files corresponding to several different programs. Additionally, to reduce encoding time, tiered quality levels of master media files might be implemented to accelerate encoding for distribution channels requiring similar levels of encoding quality. However, the examples given in this application shall focus on a single master media file for simplicity. Additionally, although only a single processor 110 is shown, alternative embodiments might use multiple processors, possibly distributed across several servers, for improved encoding performance.

For example, master media file 120 might be targeted for three different distribution channels: distribution channel A, or retail DVD-Video discs, distribution channel B, or Internet based video streaming, and distribution channel C, or mobile device video streaming. Distribution channel A might require video files in Moving Picture Experts Group (MPEG) 2 format with Dolby Digital Audio Coding 3 (AC-3) audio suitable for DVD Video, distribution channel B might require video files in 1.5 Mbit/s H.264 (MPEG-4 Advanced Video Coding) format with audio in 128 Kbit/s Advanced Audio Coding (AAC) suitable for online distribution, and distribution channel C might require video files in a proprietary codec optimized for mobile devices, such as the Mobiclip codec by Actimagine. Thus, codec 130a could comprise an MPEG2 codec, with encoding profile 131a configured for DVD-Video, codec 130b could comprise a H.264 and AAC codec, with encoding profile 131b configured for a 1.5 Mbit/s bit-rate video and 128 Kbit/s audio, and codec 130c could comprise the proprietary codec, with encoding profile 131c configured for a particular mobile device, such as a mobile phone with a 320×480 resolution.

Processor 110 may then decode/encode or transcode master media file 120 using one of codecs 130a-130c resulting in transcoded media files 140a-140c, respectively. However, since transcoding necessarily entails some level of quality degradation compared to the original source material, it is important to have some quality assurance scheme to ensure adequate results suitable for each distribution channel. For example, if encoding profile 131a is poorly configured, for example neglecting to de-interlace interlaced content, then transcoded media file 140a may exhibit severe visual artifacts, rendering it almost unsuitable for watching. Many codecs also offer many advanced settings that can be adjusted for optimal encoding quality, such as multi-pass bit-rate optimization, key frame and scene detection settings, motion prediction, quantizer levels, and other options. If these advanced settings are not carefully configured, less than optimal quality may result.

Unfortunately, it is difficult to achieve automated quality analysis of transcoded media files, since codecs rely on removing or simplifying sensory content such that human perception cannot easily discern a qualitative difference after processing. To a machine, these qualitative differences are difficult to quantify in an automatic manner. Thus, until some automated method of quality assurance is developed, quality assurance scheme 150 may simply comprise a human quality assurance tester manually viewing or listening to transcoded media files 140a-140c for any possible quality issues. If, during testing, quality issues are detected by the tester, then the corresponding encoding profiles can be adjusted, a newly transcoded media file can be created using the corresponding codec, and quality assurance scheme 150 may be reapplied to the newly transcoded media file. This process may be iterated as necessary until a satisfactory result is achieved, resulting in quality assured media files 160a-160c.

At this point, encoding profiles 131a-131c, when processed using codecs 130a-130c, respectively, are known to generate quality assured media files 160a-160c, respectively. While storing quality assured media files 160a-160c for future retrieval is one method of circumventing duplicative transcoding and quality assurance steps in the future, this approach may quickly consume large amounts of scarce storage space. In particular, embodiments supporting tens or hundreds of different distribution channels with unique encoding requirements may consume unreasonable amounts of storage space, increasing costs of ownership due to expanded storage infrastructure requirements and higher maintenance complexity. Moreover, distribution channels may vary in practices for archiving transcoded media files provided by content producers. For example, some distributors may be vigilant about keeping transcoded media files and rarely request for additional provisions of transcoded media files, whereas other distributors may be less rigorous with archival policies and therefore rely on the content producer to provide transcoded media files on demand. Storing every possible transcoded media file does not effectively leverage distributors that may enforce robust archival practices.

To overcome this problem in the art, the hash values of quality assured media files 160a-160c are calculated via hash function 170, resulting in hash values 185a-185c to be stored into database 181 of memory 180. Hash function 170 could comprise any hash function, checksum algorithm, or other deterministic procedure for reducing an arbitrary data block to a fixed-size bit string, such as Message Digest 5 (MD5), Secure Hash Algorithm (SHA), Cyclic Redundancy Check 32 (CRC-32), or Adler-32. To minimize hash collisions and provide greater resiliency against false positives, it may be desirable to use larger key values and more sophisticated hash algorithms. Even with large key values, storing only hash values 185a-185c in database 181 rather than transcoded media files 140a-140c decreases storage requirements by orders of magnitude, as only short fixed length bit strings need to be stored rather than full-length media files.

With database 181 containing hash values of quality assured media files, database 181 can be queried to verify that any untested media file is equivalent to a previously quality assured media file, circumventing the need to reapply quality assurance scheme 150 to the untested media file. With the addition of metadata 186a-186c, which might include data such as encoding profiles 131a-131c, codecs 130a-130c, metadata regarding master media file 120, and metadata regarding distribution channels A-C, database 181 can also provide enough information to match an untested media file to a quality assured transcode of a particular master media file and a particular encoding profile. With metadata 186a-186c, database 181 may also provide the capability to transcode a new media file on demand for a particular distribution channel, using a codec and an encoding profile already previously validated to generate quality assured results. Moreover, by analyzing the nature of the demands, frequently requested transcodes can be cached and stored in a media cache, reducing encoding burdens while optimizing the use of limited storage.

Figure 2:
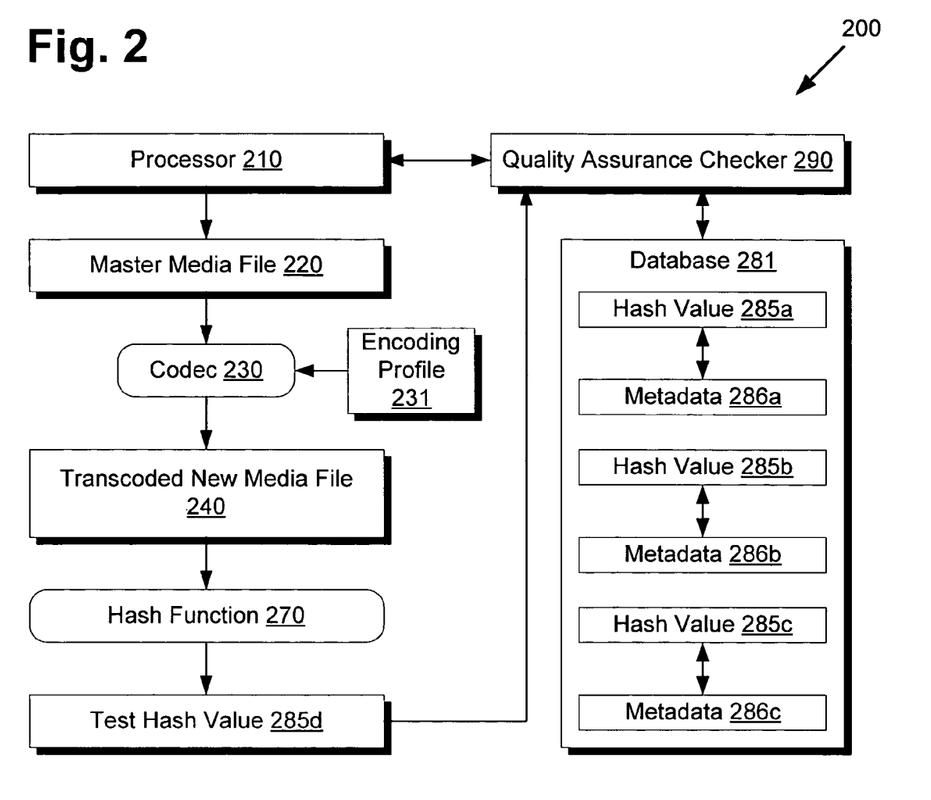
FIG. 2 presents a block diagram of a system for verifying quality of a media file by checking against hash values of quality assured media files, according to one embodiment of the present invention.

FIG. 2 presents a block diagram of a system for verifying quality of a media file by checking against hash values of quality assured media files, according to one embodiment of the present invention. Environment 200 includes processor 210, master media file 220, codec 230, encoding profile 231, transcoded new media file 240, hash function 270, test hash value 285d, quality assurance checker 290, and database 281. Database 281 includes hash values 285a-258c and metadata 286a-286c. Processor 210 corresponds to processor 110 from FIG. 1. Master media file 220 corresponds to master media file 120. Hash function 270 corresponds to hash function 170. Database 281 corresponds to database 181. Hash values 285a-285c correspond to hash values 185a-185c. Metadata 286a-286c correspond to metadata 186a-186c.

Environment 200 shows a process by which processor 210 can validate, via quality assurance checker 290, any arbitrary media file as having an assured quality. However, in practice, processor 210 may likely validate media files transcoded from a master media file, such as master media file 220. Database 281 may already be populated with hash values 285a-285c and metadata 286a-286c, corresponding to previously quality assured transcoded media files.

Thus, given that master media file 220 is intact, and that encoding profile 231 and codec 230 are known to produce a quality assured transcode, then transcoded new media file 240 should have an assured quality. However, due to complexity in codec configuration, software version mismatches, environmental or architectural differences, processing anomalies, or other factors between an original encoding scheme and a new encoding scheme, transcoded new media file 240 may still have quality issues. Thus, there needs to be some method to verify that transcoded new media file 240 actually has assured quality.

Processor 210 can therefore calculate hash value 285b of transcoded media file 240 via hash function 270, and pass test hash value 285d to quality assurance checker 290 for querying against database 281. If database 281 is able to match test hash value 285d to any existing hash value in database 281, including hash values 285a-285c, then quality assurance checker 290 can report that transcoded new media file 240 has an assured quality, and also report associated metadata from metadata 286a-286c. Conversely, if test hash value 285d does not exist in database 281, then quality assurance checker 290 can report that transcoded new media file 240 does not necessarily have an assured quality.

Associated metadata 286a-286c may also provide additional information allowing greater confidence in the case of a hash collision, by providing additional details regarding codec 230, encoding profile 231, and master media file 220. If these additional details match, then there is much greater confidence that transcoded new media file 240 has an assured quality. Hash function 270 ideally reduces the chance of a hash collision to an infinitesimally small chance, but hash collisions may still occur and need to be accounted for. Thus, if metadata associated with a hash value match in database 281 is observed as nonsensical, then the hash value match might be dismissed as a mere hash collision. Additionally, if legitimate quality assured media files happen to have identical hash values, which should be unlikely given a strong hash function but may nevertheless still occur, then the associated metadata can provide guidance as to which hash is correct. Alternatively, colliding hash values might be assigned to adjacent hash values, or some other method of uniquely resolving hash values might be used.

For example, a hash collision resolving system is often implemented for audio CD database systems, as they typically use short hash values with a high chance of hash collisions. If an audio CD with multiple hash results is found, a requesting client is often prompted to select the most likely audio CD using associated metadata from matching hash values. A similar mechanism could be used for quality assurance checker 290 to account for hash collisions existing in database 281. Thus, quality assurance checker 290, in conjunction with processor 210, can determine whether a media file has an assured quality by querying database 281 for hash values of previously quality assured media files, and quality assurance checker 290 can also gracefully handle hash collisions by using associated metadata in database 281.

Figure 3:
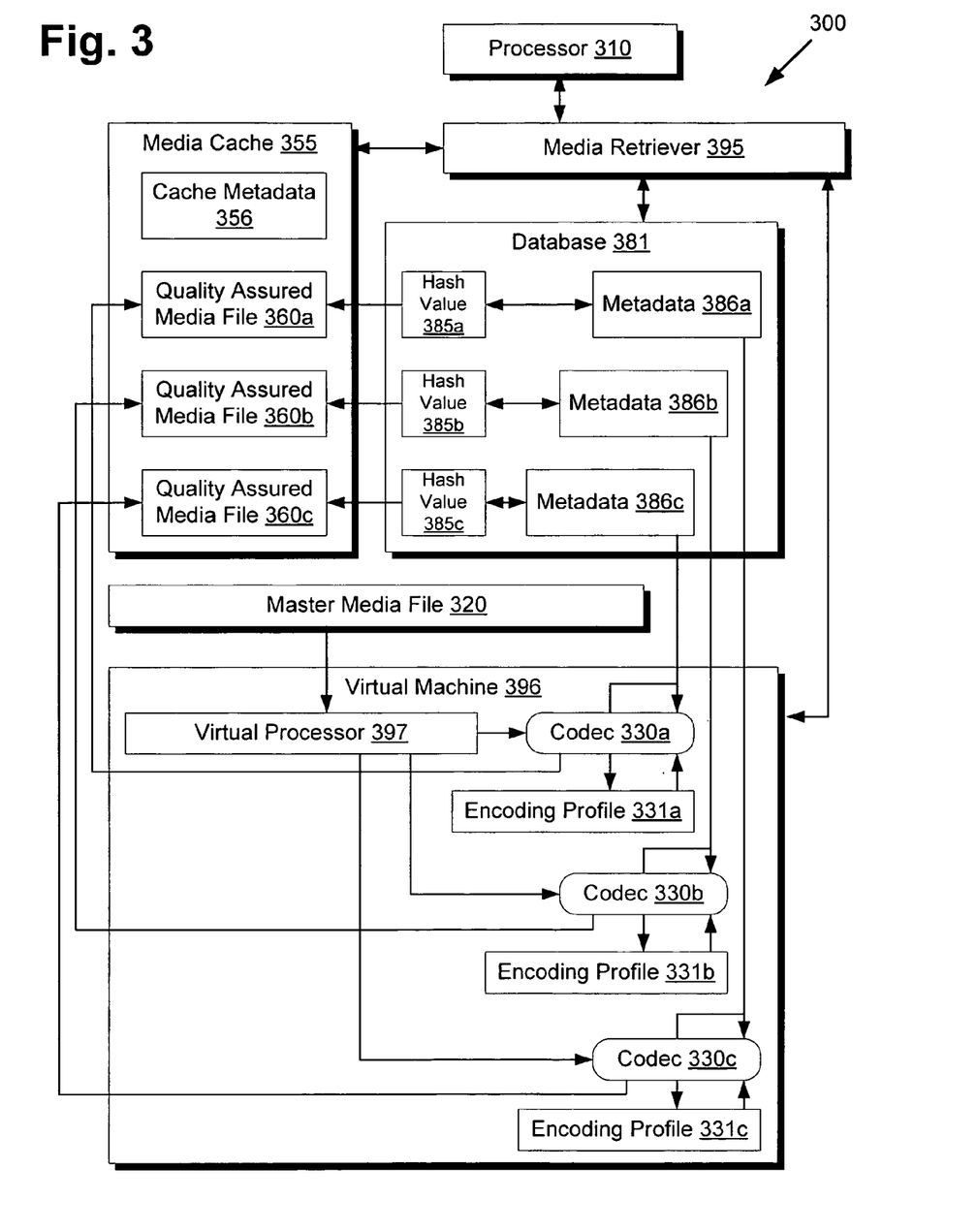
FIG. 3 presents a block diagram of a system for retrieval of quality assured media files equivalent to a master media file transcoded by specified encoding profiles, according to one embodiment of the present invention.

FIG. 3 presents a block diagram of a system for retrieval of quality assured media files equivalent to a master media file transcoded by specified encoding profiles, according to one embodiment of the present invention. Environment 300 includes processor 310, media cache 355, media retriever 395, database 381, master media file 320, and virtual machine 396. Media cache 355 includes cache metadata 356, and quality assured media files 360a-360c. Database 381 includes hash values 385a-385c, and metadata 386a-386c. Virtual machine 396 includes virtual processor 397, codecs 330a-330c, and encoding profiles 331a-331c.

Processor 310 corresponds to processor 110 of FIG. 1. Database 381 corresponds to database 181. Hash values 385a-385c correspond to hash values 185a-185c, respectively. Metadata 386a-386c correspond to metadata 186a-186c, respectively. Quality assured media files 360a-360c correspond to quality assured media files 160a-160c, respectively. Master media file 320 corresponds to master media file 120. Codecs 330a-330c correspond to codecs 130a-130c, respectively. Encoding profiles 331a-331c correspond to encoding profiles 131a-131c, respectively.

Media retriever 395 executing on processor 310 can retrieve, on demand, any quality assured media file corresponding to known transcoding settings specified in metadata 386a-386c. Thus, media retriever 395 can retrieve any of quality assured media files 360a-360c, if they happen to exist in media cache 355. Additionally, media retriever 395 can generate quality assured media files 360a-360c for storage in media cache 355, if they do not exist in media cache 355. Cache metadata 356 may contain statistics, including for example, previous demands for quality assured media files, allowing media cache 355 to optimize limited storage space by removing quality assured media files that are requested infrequently. Thus, frequently requested quality assured media files can remain in media cache 355 and be provided immediately via hash table lookup, for example. On the other hand, infrequently requested quality assured media files can be generated on the fly using virtual machine 396, thereby minimizing processing burdens on processor 310 while optimizing storage utilization of media cache 355.

Continuing with the three distribution channels A-C used as examples with FIG. 1, assume that a request is sent to media retriever 395 for a quality assured media file generated from master media file 320 and suitable for distribution channel A. Metadata 386a might contain data specifying that the source file is master media file 320, the target is distribution channel A, the codec is codec 330a, and the encoding profile is encoding profile 331a. Thus, database 381 can be queried for metadata matching a source file of master media file 320 and a target of distribution channel A, which is metadata 386a. Metadata 386a is further linked to hash value 385a, which references quality assured media file 360a in media cache 355. Assuming that quality assured media file 360a has not been deleted from media cache 355, media retriever 395 can simply access media cache 355 and retrieve quality assured media file 360a. If, however, quality assured media file 360a does not exist in media cache 355, then virtual machine 396 may be used to recreate quality assured media file 360a.

Virtual machine 396 provides a virtualized encoding environment for processor 310, minimizing the chance that differing environmental conditions between an original decode/encode or transcode and a new decode/encode or transcode result in differently transcoded media files. By carrying out the original encoding steps for generating hash values 385a-385c in a virtualized environment, and by carrying out any new transcodes in the same virtualized environment, variables such as operating system, hardware, codec revisions, and other conditions can be kept constant. By at least keeping these conditions constant, the chances of achieving deterministic output between transcodes at different points in time, on differing hardware, or with other differing conditions are greatly improved.

Virtual machine 396 can be provided with access to master media file 320, and codec 330a and encoding profile 331a can be provided via metadata 386a. Virtual processor 397 running on processor 310 can then use codec 330a and encoding profile 331a to generate quality assured media file 360a, which can be deposited in media cache 355. Additionally, by verifying that a hash calculated on quality assured media file 360a matches hash value 385a in database 381, media retriever 395 can assert with some confidence that quality assured media file 360a indeed has assured quality. These steps may also be used for requests targeting distribution channel B or C, as shown by environment 300. In this manner, processor 310 in conjunction with media retriever 395, media cache 355, database 381, and virtual machine 396 provide a balanced way to retrieve quality assured media files, optimizing both storage footprint at media cache 355 and computing resources at processor 310.

Figure 4:
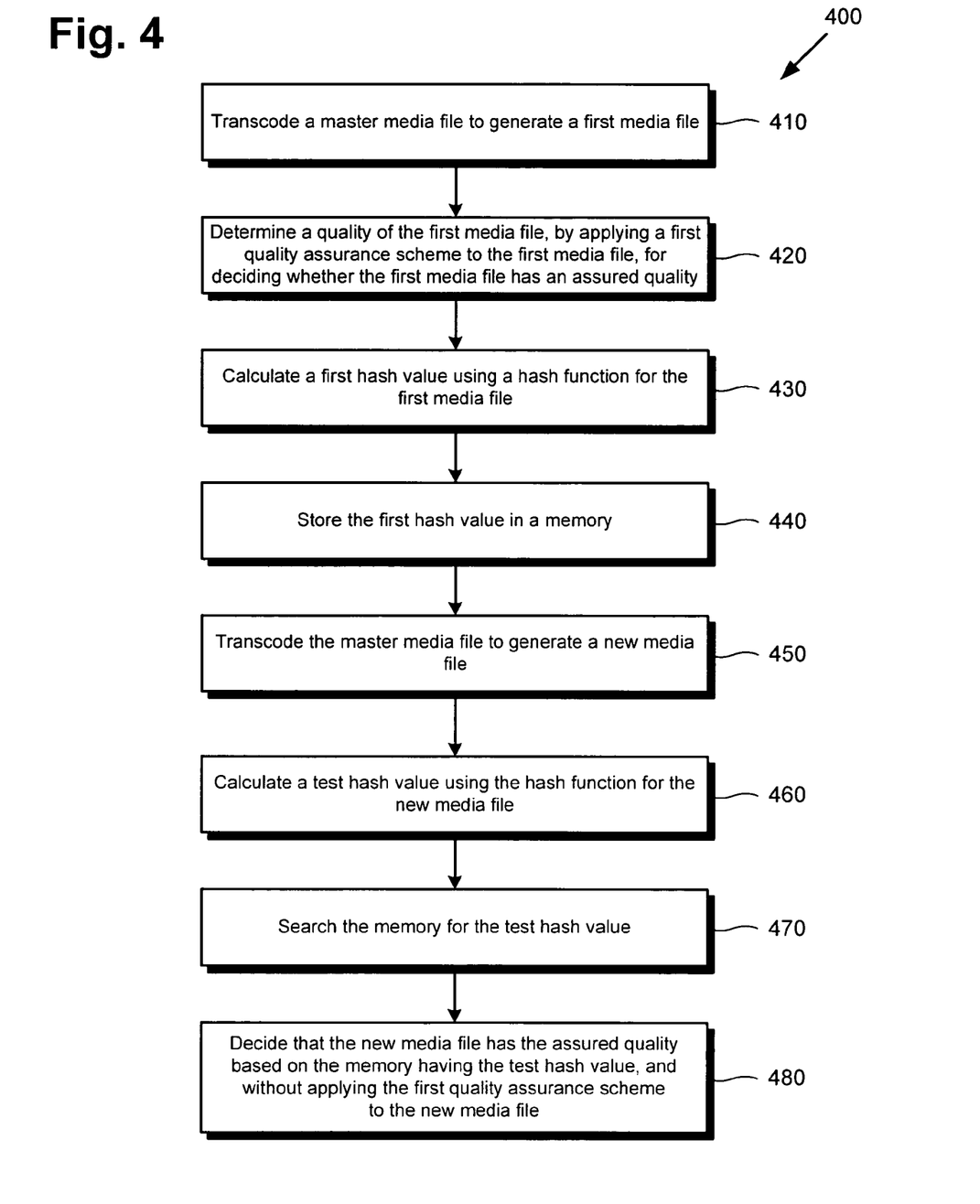
FIG. 4 shows a flowchart describing the steps, according to one embodiment of the present invention, by which a processor can verify quality of a new media file without applying a quality assurance scheme to the new media file.

FIG. 4 shows a flowchart describing the steps, according to one embodiment of the present invention, by which a processor can verify quality of a new media file without applying a quality assurance scheme to the new media file. Certain details and features have been left out of flowchart 400 that are apparent to a person of ordinary skill in the art. For example, a step may comprise one or more substeps or may involve specialized equipment or materials, as known in the art. While steps 410 through 480 indicated in flowchart 400 are sufficient to describe one embodiment of the present invention, other embodiments of the invention may utilize steps different from those shown in flowchart 400.

Referring to step 410 of flowchart 400 in FIG. 4 and environment 100 of FIG. 1, step 410 of flowchart 400 comprises processor 110 transcoding master media file 120 to generate transcoded media file 140a. Although three transcoded media files are shown in FIG. 1, only transcoded media file 140a shall be used for the purposes of flowchart 400 of FIG. 4. To accomplish step 410, processor 110 configures codec 130a with encoding profile 131a, master media file 120 as a source file, and transcoded media file 140a as a target file. As previously discussed with FIG. 3, processor 110 might also carry out step 410 within a virtualized environment, allowing greater adherence to deterministic behavior by keeping environmental variables constant between encodes.

Referring to step 420 of flowchart 400 in FIG. 4 and environment 100 of FIG. 1, step 420 of flowchart 400 comprises processor 110 determining a quality of transcoded media file 140a by applying quality assurance scheme 150 to transcoded media file 140a, for deciding whether transcoded media file 140a has an assured quality. As previously discussed, step 420 may comprise a manual monitoring process where a human quality assurance tester inspects the video and audio quality of transcoded media file 140a, and declares an assured quality if there are no defects disproportionate to the intended distribution channel. For example, bandwidth constricted mobile content might have more lenient quality standards than high quality DVD video, but each distribution channel may also have certain base guidelines for acceptable quality. For example, visible macro-block artifacts per time unit might comprise one factor for judging quality; another factor might incorporate motion smoothness or edge definition, and more subjective measures of quality might be given some weight as well. Until a reliable and automated process for evaluating quality of transcoded media files is developed, quality assurance staff may manually assist processor 110 in determining an assured quality.

Referring to step 430 of flowchart 400 in FIG. 4 and environment 100 of FIG. 1, step 430 of flowchart 400 comprises processor 110 calculating hash value 185a using hash function 170 for transcoded media file 140a. As previously discussed, hash function 170 could comprise any function capable of reducing an arbitrary data block to a fixed-size bit string, such as MD5, SHA, CRC-32, or Adler-32. Although redundant parity data or error correction codes such as Reed-Solomon could also conceivably be used, they typically require significant processing overhead that may be undesirable. Thus, a more quickly calculated hash function may suffice for the purposes of step 430, as hash value 185a will be used primarily to match against other hash values, and not to repair transcoded media file 140a.

Referring to step 440 of flowchart 400 in FIG. 4 and environment 100 of FIG. 1, step 440 of flowchart 400 comprises processor 110 storing hash value 185a in memory 180. In the case of environment 100, hash value 185a is further contained within database 181 so that corresponding metadata 186a can be easily associated with hash value 185a. In a more minimal implementation, a simple hash table rather than a database might be utilized. However, to provide more robust data manipulation capabilities, a database might be preferred. Memory 180 also preferably comprises non-volatile memory, so that the contents of database 181 are not lost in the event of a power cycle or outage.

Referring to step 450 of flowchart 400 in FIG. 4 and environment 200 of FIG. 2, step 450 of flowchart 400 comprises processor 210 transcoding master media file 220 to generate transcoded new media file 240. Similar to step 410, processor 210 configures codec 230 with encoding profile 231, master media file 220 as a source file, and transcoded new media file 240 as a target file. Again, virtualization can be used to ensure that step 450 executes in an environment similar to that of step 410, allowing greater adherence to deterministic behavior.

Referring to step 460 of flowchart 400 in FIG. 4 and environment 200 of FIG. 2, step 460 of flowchart 400 comprises processor 210 calculating test hash value 285d using hash function 270 for master media file 220. It should be noted that hash function 270 is identical to hash function 170 used in step 430, and that master media file 220 is also identical to master media file 120 used in the previous steps.

Referring to step 470 of flowchart 400 in FIG. 4 and environment 200 of FIG. 2, step 470 of flowchart 400 comprises processor 210 searching a memory having database 281 for a hash value equivalent to test hash value 285d. In environment 200, quality assurance checker 290 takes test hash value 285d and searches database 281 for any hash value equivalent to test hash value 285d. Assuming that codec 230 and encoding profile 231 are identical to codec 130a and encoding profile 131a from step 410, then test hash value 285d resulting from step 460 should be equivalent to hash value 185a from step 430, and hash value 285a should therefore match test hash value 285d. However, if codec 230 and encoding profile 231 are not selected from codecs 130a-130c and encoding profile 131a to 131c, then test hash value 285d should result in an unrecognized hash value not existing within database 281.

Referring to step 480 of flowchart 400 in FIG. 4 and environment 200 of FIG. 2, step 480 of flowchart 400 comprises processor 210 deciding that transcoded new media file 240 has the assured quality determined from step 420 based on whether step 470 indicates that database 281 has a hash value equivalent to test hash value 285d, and without applying quality assurance scheme 150 of FIG. 1 to transcoded new media file 240. Since database 281 contains hash values of only quality assured media files, a matching hash value from an unknown media file indicates quality assurance of the unknown media file, since the matching hash value indicates equivalence to one of the quality assured media files. If step 470 indicates that a hash value equivalent to test hash value 285d exists in database 281, then quality assurance checker 290 can report to processor 210 that transcoded new media file 240 has the assured quality without having to apply quality assurance scheme 150 again. On the other hand, if step 470 indicates that no hash value equivalent to test hash value 285d exists in database 281, then quality assurance checker 290 can report to processor 210 that transcoded new media file 240 has no guarantee of any assured quality. As previously discussed, various strategies for dealing with potential hash collisions can be implemented to mitigate or avoid the effects of hash collisions. However, with a sufficiently long hash bit-string size and a robust hash function, hash collisions can be reduced to a minor and rare occurrence.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A system for verifying quality of a new media file, the system comprising a hardware processor configured to execute software instructions in computer readable medium to:
   transcode, by the hardware processor, a master media file to generate a first media file;
   determine, by the hardware processor, a quality of the first media file, by applying a first quality assurance scheme to the first media file, for deciding whether the first media file has an assured quality;
   calculate, by the hardware processor, a first hash value using a hash function for the first media file, after deciding the first media file has the assured quality;
   store, by the hardware processor, the first hash value in a memory;
   store, by the hardware processor, metadata associated with the first hash value in the memory;
   transcode, by the hardware processor, the master media file to generate the new media file;
   calculate, by the hardware processor a test hash value using the hash function for the new media file;
   search, by the hardware processor, the memory for the test hash value using the metadata; and
   decide, by the hardware processor, that the new media file has the assured quality based on the memory having the test hash value, and without applying the first quality assurance scheme to the new media file.

2. The system of claim 1, wherein the hardware processor is configured to use Message-Digest algorithm 5 (MD5) for the hash function.

3. The system of claim 1, wherein the hardware processor is configured to use a cyclic redundancy check (CRC) for the hash function.

4. The system of claim 1, wherein the hardware processor is configured to calculate the first hash value and the test hash value within a virtual machine.

5. The system of claim 1, wherein the hardware processor is configured to store the first hash value in a database within the memory, and wherein the hardware processor is configured to search the database within the memory for the test hash value.

6. The system of claim 5, wherein the hardware processor is further configured to store the metadata associated with the first hash value in the database, and wherein the hardware processor uses the metadata when searching the database to avoid hash collisions.

7. A method for use by a hardware processor to verify quality of a new media file, the method comprising:
   transcoding, by the hardware processor, a master media file to generate a first media file;
   determining, by the processor a quality of the first media file, by applying a first quality assurance scheme to the first media file, for deciding whether the first media file has an assured quality;
   calculating, by the hardware processor a first hash value using a hash function for the first media file, after deciding the first media file has the assured quality;
   storing, by the hardware processor the first hash value in a memory;
   storing, by the hardware processor metadata associated with the first hash value in the memory;
   transcoding, by the hardware processor the master media file to generate the new media file;
   calculating, by the hardware processor a test hash value using the hash function for the new media file;
   searching, by the hardware processor the memory for the test hash value using the metadata; and
   deciding, by the hardware processor that the new media file has the assured quality based on the memory having the test hash value, and without applying the first quality assurance scheme to the new media file.

8. The method of claim 7, wherein the hash function comprises Message-Digest algorithm 5 (MD5).

9. The method of claim 7, wherein the hash function comprises a Secure Hash Algorithm (SHA).

10. The method of claim 7, wherein the hash function comprises a cyclic redundancy check (CRC).

11. The method of claim 7 calculating the first hash value and calculating the test hash value are performed within a virtual machine.

12. The method of claim 7, wherein the hardware processor stores the first hash value in a database within the memory, and wherein the hardware processor searches the database within the memory for the test hash value.

13. The method of claim 12, wherein the hardware processor further stores the metadata associated with the first hash value in the database, and wherein the hardware processor uses the metadata when searching the database to avoid hash collisions.

\* \* \* \* \*